(12) United States Patent
Bang

(10) Patent No.: US 10,697,566 B2
(45) Date of Patent: Jun. 30, 2020

(54) METHODS FOR MANUFACTURING METAL-RESIN COMPOSITE PIPE THAT CAN BE EASILY WOUND INTO RING SHAPE

(71) Applicant: Kumkang Co., Ltd., Jinju-si, Gyeongsangnam-do (KR)

(72) Inventor: Manhyuk Bang, Jinju-si (KR)

(73) Assignee: KUMKANG CO., LTD., Jinju-Si (KR)

( * ) Notice: Subject to any disclaimer, the term of this patent is extended or adjusted under 35 U.S.C. 154(b) by 0 days.

(21) Appl. No.: 15/727,167

(22) Filed: Oct. 6, 2017

(65) Prior Publication Data
US 2018/0031151 A1 Feb. 1, 2018

Related U.S. Application Data

(62) Division of application No. 14/396,363, filed as application No. PCT/KR2012/007863 on Sep. 27, 2012.

(30) Foreign Application Priority Data

Apr. 23, 2012 (KR) .......................... 10-2012-0042189

(51) Int. Cl.
*F16L 9/127* (2006.01)
*B05D 7/14* (2006.01)
(Continued)

(52) U.S. Cl.
CPC .............. *F16L 9/147* (2013.01); *B05D 1/265* (2013.01); *B05D 7/146* (2013.01); *B29C 48/09* (2019.02);
(Continued)

(58) Field of Classification Search
CPC ........... B05D 1/265; B05D 7/146; B05D 7/54
See application file for complete search history.

(56) References Cited

U.S. PATENT DOCUMENTS

| 3,606,635 A | 9/1971 | Benteler et al. |
| 3,635,615 A | 1/1972 | Hartmann et al. |

(Continued)

FOREIGN PATENT DOCUMENTS

| DE | 10309908 A1 | 9/2004 |
| DE | 102005061191 A1 | 7/2007 |

(Continued)

OTHER PUBLICATIONS

U.S. Office Action issued in U.S. Appl. No. 14/396,363 dated Dec. 26, 2017.

(Continued)

*Primary Examiner* — Dah-Wei D. Yuan
*Assistant Examiner* — Kristen A Dagenais-Englehart
(74) *Attorney, Agent, or Firm* — Cantor Colburn LLP

(57) ABSTRACT

The present invention may manufacture a composite pipe by forming an adhesive layer and a resin layer on an outer surface of a metal pipe, and although the composite pipe is wound in a ring shape after the composite pipe is manufactured, a circular cross sectional shape may be maintained without deformation, and after the composite pipe is straightened for the purpose of construction, separation or buckling may be prevented, resulting in excellent transportability and constructability of a product.

6 Claims, 3 Drawing Sheets

(51) Int. Cl.
*F16L 9/147* (2006.01)
*B29C 48/09* (2019.01)
*B29C 48/21* (2019.01)
*B29C 48/92* (2019.01)
*B29C 48/151* (2019.01)
*B29C 48/285* (2019.01)
*B05D 1/26* (2006.01)
*B29L 23/00* (2006.01)
*B05D 7/00* (2006.01)
*B29C 48/28* (2019.01)

(52) U.S. Cl.
CPC .......... *B29C 48/151* (2019.02); *B29C 48/21* (2019.02); *B29C 48/2883* (2019.02); *B29C 48/92* (2019.02); *B05D 7/54* (2013.01); *B29C 48/28* (2019.02); *B29C 2948/92152* (2019.02); *B29C 2948/92447* (2019.02); *B29C 2948/92647* (2019.02); *B29C 2948/92904* (2019.02); *B29L 2023/22* (2013.01)

(56) References Cited

U.S. PATENT DOCUMENTS

| | | | |
|---|---|---|---|
| 3,815,640 A | 6/1974 | Iida et al. | |
| 4,216,802 A * | 8/1980 | Bonnes | F16L 58/109 138/143 |
| 4,606,953 A | 8/1986 | Suzuki et al. | |
| 4,990,383 A | 2/1991 | Bergstrom et al. | |
| 5,851,289 A * | 12/1998 | Sato | B05C 5/0254 118/411 |
| 6,030,672 A * | 2/2000 | Usui | B05D 7/146 138/141 |
| 6,412,521 B1 | 7/2002 | Sausner et al. | |
| 6,589,617 B2 | 7/2003 | Hsich et al. | |
| 2003/0178082 A1 * | 9/2003 | Yamaguchi | B29C 61/006 138/129 |
| 2009/0093591 A1 * | 4/2009 | Lyons | C08L 23/06 525/200 |
| 2010/0155019 A1 * | 6/2010 | Zhou | F28D 15/043 165/104.26 |

FOREIGN PATENT DOCUMENTS

| | | |
|---|---|---|
| EP | 1859926 A1 | 11/2007 |
| GB | 2325420 A | 11/1998 |
| GB | 2431974 A | 5/2007 |
| JP | 6-304987 A | 11/1994 |
| JP | H06-344443 A | 12/1994 |
| JP | H07-108581 A | 4/1995 |
| JP | 7-156241 A | 6/1995 |
| JP | H09-201903 A | 8/1997 |
| JP | 2002-172692 A | 6/2002 |
| JP | 2005-178031 A | 7/2005 |
| KR | 10-0667174 B1 | 1/2007 |
| KR | 10-0876659 B1 | 1/2009 |
| KR | 10-1094185 B1 | 12/2011 |
| WO | 9961833 A1 | 12/1999 |
| WO | 2007017508 A2 | 2/2007 |

OTHER PUBLICATIONS

U.S. Non-Final Office Action dated Jul. 14, 2017 issued in U.S. Appl. No. 14/396,363.
Extended European Search Report issued in European Patent Application No. 12875431.4 dated Nov. 24, 2015.
International Search Report issued in International Patent Application No. PCT/KR2012/007863 dated Mar. 4, 2013 with English translation.
Registered letter from European Patent Office for corresponding European Patent Application No. 12875431.4 dated Apr. 26, 2019.
European Office Action issued in European Patent Application No. 12875431.4 dated Apr. 10, 2017.
European Office Action issued in European Patent Application No. 12875431.4 dated Nov. 15, 2017.
European Office Action issued in European Patent Application No. 12875431.4 dated Jun. 15, 2018.

* cited by examiner

METHODS FOR MANUFACTURING METAL-RESIN COMPOSITE PIPE THAT CAN BE EASILY WOUND INTO RING SHAPE

RELATED APPLICATIONS

This application is the Divisional Patent Application of U.S. patent application Ser. No. 14/396,363, filed on Oct. 22, 2014 which is a U.S. National Phase under 35 U.S.C. § 371 of International Application No. PCT/KR2012/007863, filed on Sep. 27, 2012, which in turn claims the benefit of Korean Application No. 10-2012-0042189, filed on Apr. 23, 2012, the disclosures of which are incorporated by reference herein.

TECHNICAL FIELD

The present invention relates to methods for manufacturing a metal-resin composite pipe, and more particularly, to methods for manufacturing the metal resin composite pipe that can be wound in a ring shape without deformation of a circular shape of a cross section of the pipe and may be manufactured with a long length to provide excellent transportability and constructability.

BACKGROUND ART

Generally, a high corrosion resistant metal pipe such as a stainless steel pipe has many advantages, but has a high unit cost of production resulting from use of a high priced material such as stainless steel, and has many difficulties in construction due to forming limitations in bending etc., and can be made straight only.

Also, a metal pipe manufactured in a straight shape has predetermined lengths for delivery, and an operation of connecting the metal pipes in a construction site requires considerable amounts of components, manpower, and time.

Also, when a metal pipe is buried in the ground, the metal pipe is inevitably susceptible to soil corrosion and electric corrosion etc.

Meanwhile, a resin pipe has a high corrosion resistance, a light weight, good constructability, and a low cost, but has a leakage risk due to separation of a connected portion caused by contraction and expansion with temperature changes and is vulnerable to pressure. Meanwhile, when manufacturing a resin pipe, extrusion is performed with an outer diameter of a resin pipe being slightly greater than a desired outer diameter, and the outer diameter is reduced through a sizing process during cooling to meet the density and surface requirements.

A metal resin composite pipe includes, as shown in FIGS. 1 and 2, a metal pipe 1 and a resin layer 5 formed on an outer surface of the metal pipe 1. A configuration and a manufacturing method of this metal resin composite pipe 10 is disclosed in Korean Patent No. 10-1094185.

The metal pipe 1 has a direct contact with a fluid flowing therethrough, and is made from a thin plate metal such as, for example, stainless steel, and thus has a high corrosion resistance. The resin layer 5 surrounds the metal pipe 1, and a thickness of the resin layer 5 is even greater than a thickness of the metal pipe 1. The resin layer 5 is made from a resin having a high corrosion resistance and a low cost. Accordingly, the metal resin composite pipe 10 has advantages of a high corrosion resistance to a fluid flowing therethrough, a high corrosion resistance to soils, and a low cost.

However, to deliver the metal resin composite pipe 10 to a construction site after manufacturing the metal resin composite pipe 10, the metal resin composite pipe 10 needs to be produced into a straight pipe having a predetermined length for the convenience of delivery, similar to a metal pipe. However, to use a straight pipe in a construction site, connecting the composite pipe 10 is required, and this connection operation involves considerable amounts of components, manpower, and time.

Accordingly, there is a need to manufacture the metal resin composite pipe 10 with a longer length while improving delivery performance.

To solve this problem, there was a need for production and supply of the metal resin composite pipe 10 by winding the metal resin composite pipe 10 circularly on a winder.

However, it is almost impossible to manufacture the metal pipe or the metal resin composite pipe 10 by winding in a ring shape due to characteristics of a material. To produce a pipe wound in a ring shape, development of a technique for winding the pipe while maintaining a circular cross section of the pipe is critical. Further, in view of storage and transportation of a product, minimizing the radius of curvature as much as possible while maintaining the circular cross section of the pipe was a problem that has to be solved. However, generally, when a bending force greater than or equal to an elastic limit is applied to the metal pipe to obtain a minimum curvature radius, a result is a deformation of the circular cross sectional shape or a folding of the pipe due to characteristics of steel, which cause a deformation of the pipe.

Meanwhile, as described in the foregoing, the metal resin composite pipe 10 is manufactured by coating an outer surface of the metal pipe 1 with a resin. The coating is implemented by a coating mold unit.

As shown in FIG. 3, a coating mold unit 20 includes an inner dice 21, an inner die lip 23 disposed at the rear of the inner dice 21, an outer die lip 25 disposed at the rear of the inner die lip 23, and an outer dice 27 surrounding the outer die lip 25.

The metal pipe 1 (not shown in FIG. 3) passes through the inner dice 21, the inner die lip 23, and the outer die lip 25 in a sequential order. An adhesive resin (not shown) is extruded on an outer surface of the metal pipe 1 through an adhesive resin injection hole 24a, and a resin is extruded through a resin injection hole 25a.

Meanwhile, as described in the foregoing, when manufacturing a resin pipe, extrusion is performed with an outer diameter of a resin pipe being slightly greater than a desired outer diameter and the outer diameter is reduced through a sizing process during cooling to meet the density and surface requirements.

However, because the metal resin composite pipe 10 includes the metal pipe 1 embedded therein, the sizing process is infeasible, resulting in a low surface quality of the composite pipe 10. When an outer diameter of the composite pipe 10 is greater than an inner diameter S1, a resin flows back and remains in a carrier within an extruder. When the outer diameter of the composite pipe 10 is less than the inner diameter S1, an outer surface of the resin layer 5 fails to contact an inner wall of the outer die lip 25 so that a surface polishing effect is not obtained, and as a result, the resin layer 5 cannot have an proper density and the surface of the resin layer 5 becomes rough, which cause a poor quality.

DISCLOSURE OF INVENTION

Technical Goals

The present invention is designed to solve the foregoing problems, and an object of the present invention is to provide methods for manufacturing a metal resin composite pipe that may be wound in a ring shape to provide excellent transportability and constructability as well as high economic efficiency, and avoids damaging roundness when winding, and is easy to straighten, and a manufacturing method thereof.

Another object of the present invention is to provide methods for manufacturing a metal resin composite pipe having a high surface quality and a proper density without passing through a sizing process, and a manufacturing method thereof.

Technical Solutions

To achieve the objects of the present invention, a metal resin composite pipe according to the present invention may include a metal pipe, a resin layer formed by coating an outer surface of the metal pipe, and an adhesive layer formed between the metal pipe and the resin layer. The resin layer adhere to the metal pipe by the adhesive layer. To wind the metal resin composite pipe in a ring shape having a minimum curvature radius, a shape deformation problem of the pipe caused by ovality of a circular cross section or folding has to be solved by adjusting a bending force greater than or equal to an elastic limit.

To wind the pipe without deformation of the circular cross section of the pipe against the bending force, rigidity may be reinforced and the radius of curvature in winding in a ring shape may be minimized as much as possible by coating with a synthetic resin having an even lower elastic coefficient than that of the metal pipe. In this instance, a thickness p of the metal pipe may be within a range of 5% to 20% of a thickness q of the resin layer.

When a thickness q of the resin layer is even greater than a thickness p of the metal pipe, that is, when a thickness ratio p/q is very small(p/q is less than 5%), a surface defect such as, for example, corrugation, may occur due to a compressive force being applied to an inner part of the composite pipe when winding, which makes it impossible to minimize the radius of curvature when winding the pipe in ring shape while maintaining the shape of the pipe and to obtain a target radius of curvature due to restoration of the resin layer.

Meanwhile, when the thickness ratio p/q exceeds 20%, that is, when the thickness q of the resin layer is relatively small, the thickness p of the metal pipe may reach a similar level to a thickness of a conventional metal pipe, which results in difficulty in bending. Also, in order to bend the composite pipe without deformation, the radius of curvature may be increased greatly, which may be unfavorable in terms of transportation and storage. Further, in outer part of the composite pipe where a tensile force being applied while winding, plastic deformation of the resin may occur because the tensile force exceeds a yielding point of the resin due to the thickness q of the resin layer is thin, accordingly the resin may lose its unique property.

Through trial and error, it is concluded that when a polymer synthetic resin is used for coating, the coating may reinforce rigidity of a stainless steel pipe, and when a ratio of thickness p of the metal pipe to the thickness q of the resin layer has a particular range, that is, 5% to 20%, a pipe wound in ring shape which is free of a cross sectional deformation may be manufactured.

The resin layer may be formed by extruding the resin on the adhesive layer continuously to coat the metal pipe with the resin. The coating may be performed by extruding the resin under a pressure of 88 kg/cm$^2$ to 96 kg/cm$^2$ while the metal pipe passes through an outer dice having an inner diameter D1 equal to an outer diameter of a composite pipe intended to manufacture or less than the outer diameter of the composite pipe intended to manufacture by 1 mm or less.

According to the present invention, a method of manufacturing a metal resin composite pipe may comprise the steps of (a) preparing a metal pipe, and (b) coating the metal pipe by forming an adhesive layer on an outer surface of the metal pipe and by forming a resin layer by extruding a resin on the adhesive layer. A thickness p of the metal pipe may be within a range of 5% to 20% of a thickness q of the resin layer.

The step (b) may be performed by extruding the adhesive resin and the resin in a sequential order while the metal pipe passes through a coating mold unit. The coating mold unit may include an inner dice, an inner die lip disposed at a rear of the inner dice, an outer die lip disposed at a rear of the inner die lip, and an outer dice surrounding the outer die lip. The metal pipe may be coated while passing through the inner dice, the inner die lip, and the outer die lip in a sequential order. An inner diameter D1 of the outer dice may be equal to an outer diameter of the composite pipe or less than the outer diameter of the composite pipe by 1 mm or less, and the extrusion may be performed by extruding the resin under a pressure of 88 kg/cm$^2$ to 96 kg/cm$^2$ being applied to the resin.

Preferably, an inner diameter D3 at a tip 233 of a slope surface 232 of the inner die lip may be greater than an outer diameter of the metal pipe by 0.1 mm to 0.2 mm.

Further, the manufacturing method may comprise, after the step (b), winding the resulting composite pipe in a ring shape. In this instance, a diameter u of the ring shape may be preferably greater 20 times to 50 times than the outer diameter of the composite pipe.

Effects of Invention

The present invention may have the following effects.

First, the metal resin composite pipe manufactured by the present invention may be wound in a ring shape to provide excellent transportability and constructability as well as high economic efficiency, avoids damaging roundness when winding, and is easy to straighten.

Second, the present invention can manufactures a metal resin composite pipe having a high surface quality and a proper density without undergoing a sizing process during the cooling.

REFERENCE SYMBOLS

Figure 1:
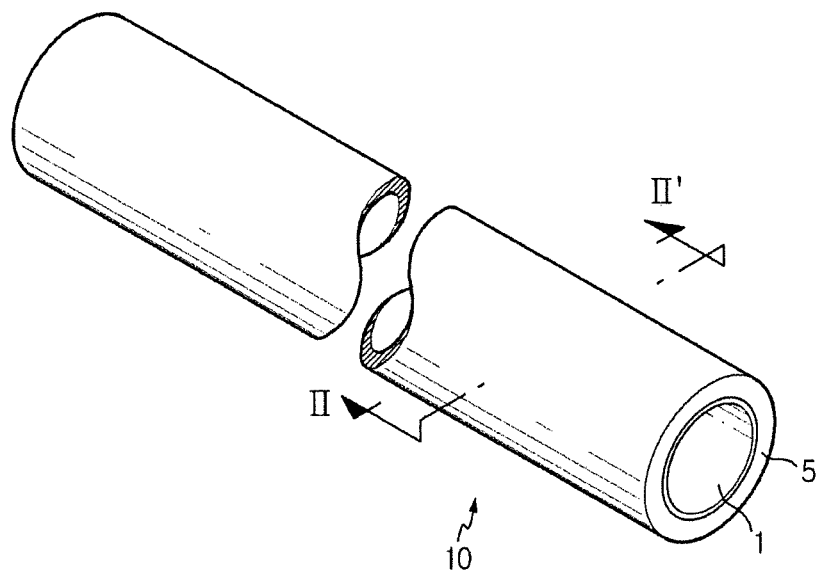
FIG. 1 is a perspective view illustrating a metal resin composite pipe according to prior art.
Figure 2:
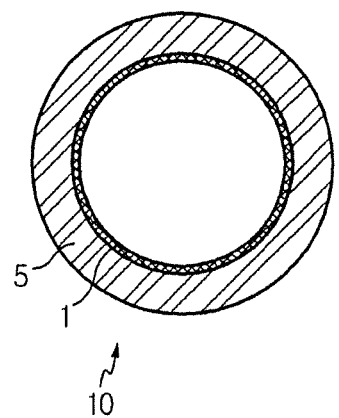
FIG. 2 is a cross sectional view taken along a line II-II' in FIG. 1.
Figure 3:
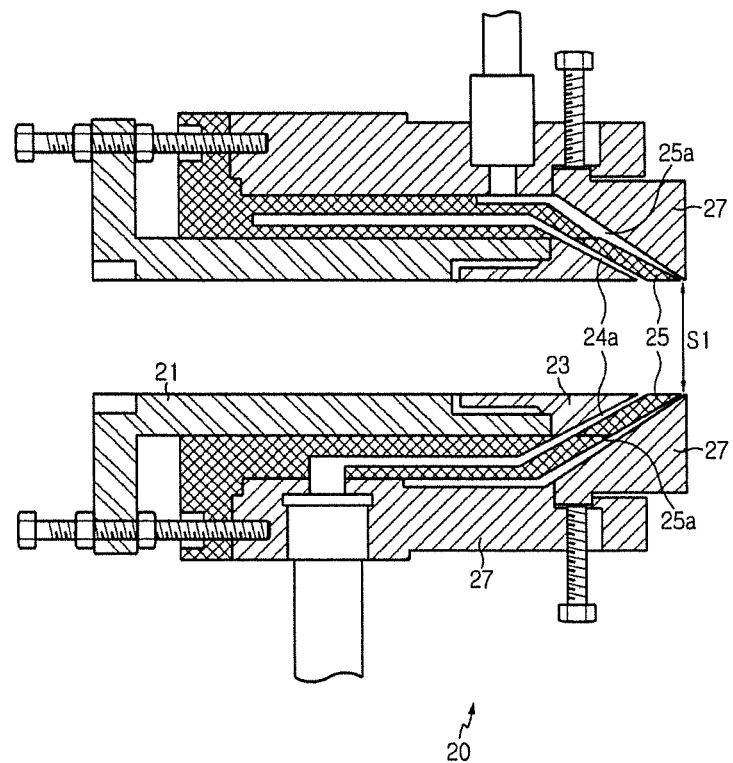
FIG. 3 is a cross sectional view illustrating a coating mold unit used to manufacture the metal resin composite pipe according to prior art.

1, 30: metal pipe
5, 50: resin layer

40: adhesive layer
1, 100: metal resin composite pipe
20, 200: coating mold unit
21, 210: inner dice
23, 230: inner die lip
25, 250: outer die lip
27, 270: outer dice
24a, 231: adhesive resin injection hole
25a, 251: resin injection hole
D1: inner diameter of the outer dice
p: thickness of the metal pipe
q: thickness of the resin layer Mode for Carrying Out the Invention Hereinafter, embodiments of the present invention are described in detail with reference to the accompanying drawings. Prior to the description, the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The present invention relates to methods for manufacturing a metal resin composite pipe, and is characterized in that the composite pipe may be wound in a ring shape, for example, in a shape of a roll, and the composite pipe having excellent density and surface quality may be manufactured without undergoing a sizing process. Accordingly, the following description is provided based on these characteristics. For a detailed description of a configuration of a general metal resin composite pipe and a manufacturing method thereof, reference may be made to Korean Patent No. 10-1094185 etc., the disclosure of which is incorporated herein in the condition of understanding a configuration of a general metal resin composite pipe and a manufacturing method thereof.

Figure 4:
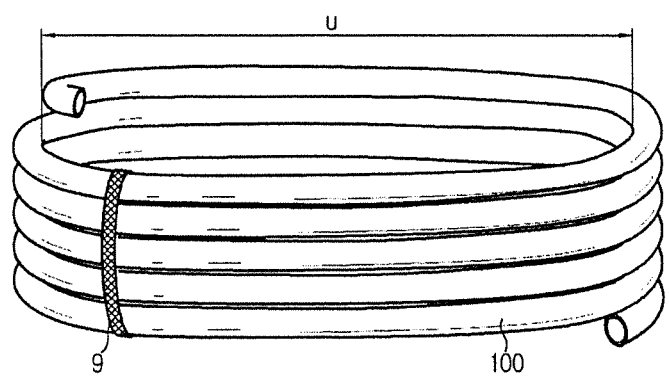
FIG. 4 is a perspective view illustrating a metal resin composite pipe wound in a ring shape manufactured according to a preferred embodiment of the present invention.
Figure 5:
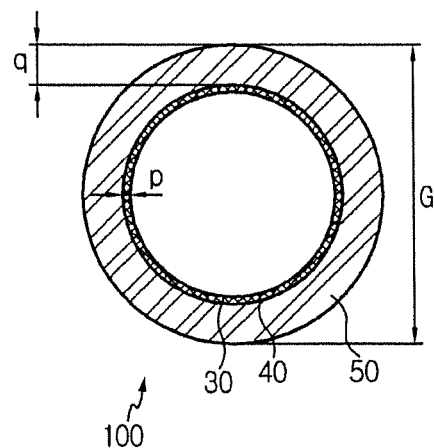
FIG. 5 is a cross sectional view of the metal resin composite pipe of FIG. 4.

FIG. 4 is a perspective view illustrating a metal resin composite pipe wound in a ring shape manufactured according to a preferred embodiment of the present invention. FIG. 5 is a cross sectional view of the metal resin composite pipe.

Referring to FIGS. 4 and 5, the metal resin composite pipe 100 may include a metal pipe 30, an adhesive layer 40 formed on an outer surface of the metal pipe 30, and a resin layer 50.

The metal pipe 30 may have a direct contact with a fluid flowing therethrough. Preferably, the metal pipe 30 may be made from a good corrosion resistant metal such as, for example, stainless steel.

The metal pipe 30 may be formed of a thin plate, and the thin plate may be thinner than the resin layer 50.

The applicant discovered through long-term experience and research that if a thickness ratio p/q of the metal pipe 30 and the resin layer 50 has a certain range, the composite pipe 100 may be easy to wind in a ring shape, for example, in a shape of a roll, and a property change of the metal pipe 30 may be prevented.

Specifically, according to the study of the applicant, in a case in which a thickness p of the metal pipe 30 is within a range of 5% to 20% of a thickness q of the resin layer 50, when the composite pipe 100 is wound in a ring shape, roundness of the cross section of the metal pipe 30 can be maintained and plasticity may be maintained so that a circular shape can be maintained and deformation of the metal pipe 30 can be prevented. In this instance, when the composite pipe 100 is wound in a ring shape, a diameter u of the ring shape may be preferably greater about 20 times to about 50 times than an outer diameter G of the composite pipe 100.

Meanwhile, the term "roundness" used herein refers to a shape of a circle in a mathematical sense or a shape analogous or similar thereto, other than a crushed circle, for example, an oval. A reference numeral 9 is a strip used to fix the wound composite pipe 100 in a ring shape.

When the thickness ratio p/q is less than 5%, plasticity may not be maintained due to elasticity or resilience of the resin layer 50 and consequently, the ring shape, for example, the shape of the roll, may not be maintained. When the thickness ratio p/q exceeds 20%, the resin layer 50 may fail to prevent deformation of the metal pipe 30, circularly winding and straightening may be difficult, properties of the metal pipe 30 may be liable to change, and economic efficiency may be reduced.

The adhesive layer 40 may be made from an adhesive resin and may allow a strong adhesion of the resin layer 50 to the metal pipe 30. The adhesive resin may include a general adhesive resin.

The resin layer 50 may be extruded on the adhesive layer 40 to coat the metal pipe 30. The resin layer 50 may be formed to have a thickness greater than the thickness p of the metal pipe 30. The resin layer 50 may be made from a resin, and the resin may include polyethylene and the like.

The adhesive resin and the resin may be extruded to form the adhesive layer 40 and the resin layer 50 while the metal pipe 30 passes through a coating mold unit.

Figure 6:
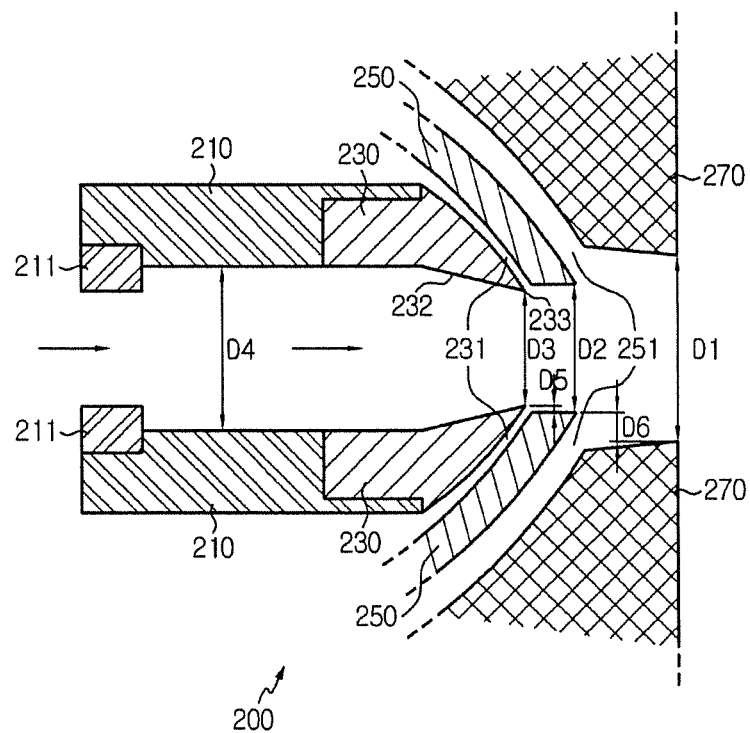
FIG. 6 is a cross sectional view illustrating a main configuration of a coating mold unit used to manufacture the metal resin composite pipe according to the present invention.

As shown in FIG. 6, the coating mold unit 200 may include an inner dice 210, an inner die lip 230 disposed at the rear of the inner dice 210, an outer die lip 250 disposed at the rear of the inner die lip 230, and an outer dice 270 surrounding the outer die lip 250.

The metal pipe 30 (not shown in FIG. 6) may pass through the inner dice 210, the inner die lip 230, and the outer die lip 250 in a sequential order. That is, the metal pipe 30 may move inside the coating mold unit 200 in a direction of an arrow.

An inner diameter D4 of the inner dice 210 may be greater than a maximum possible outer diameter of the metal pipe 30 in the coating mold unit 200.

The inner die lip 230 may include a slope surface 232 formed inside, and an inner diameter D3 at a tip 233 of the slop surface 232 may be greater than an outer diameter of the metal pipe 30 by 0.1 mm to 0.2 mm. The tip 233 may guide the sliding of the metal pipe 30 together with a metal ring 211.

Meanwhile, the inner die lip 230, the outer die lip 250, the outer dice 270, and the metal ring 211 may be detachably installed, and may be properly replaced in consideration of the outer diameter of the metal pipe 30 to guide the sliding of the metal pipe 30 and to allow proper extrusion.

The outer die lip 250 may have an inner diameter D2 greater than an inner diameter D3. An inner diameter difference D2-D3 may allow a space for extrusion of an adhesive resin. The adhesive resin (not shown) may be extruded on the outer surface of the metal pipe 30 through an adhesive resin injection hole 231 formed between the inner die lip 230 and the outer die lip 250.

The outer dice 270 may surround the outer die lip 250, and may have an inner diameter D1 greater than the inner diameter D2. An inner diameter difference D1-D2 may allow a space for extrusion of a resin. The resin (not shown) may be extruded through a resin injection hole 251 formed between the outer die lip 250 and the outer dice 270.

Meanwhile, as described in the foregoing, when manufacturing a resin pipe, extrusion is performed with an outer diameter of a resin pipe being greater than a desired outer diameter by 2 mm to 5 mm, and the outer diameter is reduced through a sizing process during the cooling to meet the density and surface requirements.

However, because the metal resin composite pipe 100 includes the metal pipe 30 embedded therein, the sizing process may be infeasible, resulting in a low surface quality of the composite pipe 100. When the outer diameter of the resin layer 50 is greater than the inner diameter D1 of the outer dice 270, an excessive resin of the resin layer 50 may flow back. When the outer diameter of the resin layer 50 is less than the inner diameter D1 of the outer dice 270, an outer surface of the resin layer 50 may fail to contact an inner surface of the outer dice 270, leading to an improper density of the resin layer 50, and the absence of a surface polishing effect may contribute to a rough surface, resulting in a low surface quality.

To solve these problems, the present invention may set the inner diameter D1 of the outer dice 270 to be equal to an outer diameter G of a resulting composite pipe(a composite pipe intended to manufacture) or to be less than the outer diameter G of the resulting composite pipe(the composite pipe intended to manufacture) by 1.0 mm or less. Also, when extruding, the present invention may apply to the resin a pressure in a range of 88 kg/cm² to 96 kg/cm² that is higher by about 10% to about 20% than a pressure of about 80 kg/cm² used in a general case.

Accordingly, when the resin is extruded under the conditions of the inner diameter D1 of the outer dice 270 equal to the outer diameter of the resulting composite pipe(the composite pipe intended to manufacture) or less than the outer diameter of the resulting composite pipe by 1 mm or less and the increased pressure, the resin may be expanded after the composite pipe is discharged from the outer dice 270 so that the resin layer 50 greater than the inner diameter D1 of the outer dice 270 may be obtained. Also, the resin layer 50 formed through this process may have a proper density and a high surface quality. That is, a product having a quality as good as a product obtained through a sizing process may be obtained without passing through a sizing process.

As described in the foregoing, because the metal pipe 30 passes through the inner dice 210 and the inner die lip 230, a gap between the tip 233 of the slope surface 232 and the metal pipe 30 may be important in ensuring roundness of the resin layer 50 of the resulting composite pipe 100 by forming the resin layer 50 uniformly. When the gap is excessively great, the resin layer 50 may have a non-uniform thickness, and preferably, the inner diameter D3 at the tip 233 may be greater than the outer diameter of the metal pipe 30 by 0.1 mm to 0.2 mm.

Hereinafter, a method of manufacturing the metal resin composite pipe 100 is described. The following description includes an extrusion process only in the manufacturing process of the metal resin composite pipe 100. Certain processes before and after the extrusion process, for example, a metal pipe manufacturing process, a cooling process, and the like, are well known in the art and disclosed in Korean Patent No. 10-1094185 etc., and thus a detailed description is omitted herein.

After the metal pipe 30 is manufactured, the metal pipe 30 may be inserted in the coating mold unit 200. When the metal pipe 30 is inserted in the inner dice 210 and makes a movement, the movement of the metal pipe 30 may be guided by the metal ring 211 and the tip 233. The adhesive resin may be extruded from the adhesive resin injection hole 231 and applied to the outer surface of the metal pipe 30, and subsequently, the resin may be extruded from the resin injection hole 251. In this instance, the resin may be extruded under a pressure of 88 kg/cm² to 96 kg/cm² that is higher than a general extrusion pressure of about 80 kg/cm² by 10% to 20%. Meanwhile, because the inner diameter D1 is equal to an outer diameter of a resulting composite pipe(composite pipe intended to manufacture) or less than the outer diameter of the resulting composite pipe by 1 mm or less, the resin layer 50 may be expanded after the composite pipe is discharged from the outer dice 270 and a composite pipe having a desired outer diameter may be manufactured by the expansion. The composite pipe 100 manufactured through this process may have advantages of a proper density and a good surface quality of the resin layer 50 without passing through a sizing process.

The invention claimed is:

1. A method of manufacturing a three-layer metal resin composite pipe for transport, the method comprising the steps of:
   (a) manufacturing a straight metal pipe (30) only using thin plate stainless steel;
   (b) coating the metal pipe (30) by forming an adhesive layer (40) on an outer surface of the metal pipe (30) and by forming a resin layer (50) by extruding a polyethylene resin on the adhesive layer (40), wherein the metal pipe (30) forms a first layer, the adhesive layer (40) forms a second layer and, the resin layer (50) forms a third layer of the three-layer metal resin composite pipe (100); and
   (c) winding the metal resin composite pipe (100) in a helix shape having a diameter (u) in a range from 20 times to 50 times of an outer diameter (G) of the metal resin composite pipe (100) and of which a number of turns is at least 5, wherein the helix shape is capable to be maintained without an external force,
   wherein a thickness (p) of the straight metal pipe (30) is within a range of 5% to 20% of a thickness (q) of the resin layer (50),
   wherein a circular cross section of the metal pipe (30) and the metal resin composite pipe (100) is maintained without deformation regardless the metal resin composite pipe (100) is wound in the step (c) or straightened back.

2. The method of claim 1, wherein the step (b) is performed by extruding the adhesive resin and the polyethylene resin in a sequential order while the metal pipe (30) passes through a coating mold unit (200),
   the coating mold unit (200) comprises an inner dice (210), an inner die lip (230) disposed at a rear of the inner dice (210), an outer die lip (250) disposed at a rear of the inner die lip (230), and an outer dice (270) surrounding the outer die lip (250),
   the metal pipe (30) is coated while passing through the inner dice (210), the inner die lip (230), and the outer die lip (250) in a sequential order, and
   an inner diameter (D1) of the outer dice (270) is less than the outer diameter (G) of the composite pipe (100) by 1 mm or less, and the extrusion is performed by extruding the polyethylene resin under a pressure of 88 kg/cm² to 96 kg/cm² being applied to the polyethylene resin.

3. The method of claim 2, wherein the inner die lip (230) includes a slope surface (232) formed inside, and the slope surface (232) extends to a tip (233) of the inner die lip (230), and the tip (233) is pointed,
    wherein the tip (233) and a metal ring (211) installed in the inner dice (210) guide the sliding of the metal pipe (30) together.

4. The method of claim 3, wherein an inner diameter (D3) at the tip (233) is greater than an outer diameter of the metal pipe (30) by 0.1 mm to 0.2 mm.

5. The method of claim 4, wherein an inner diameter (D2) of the outer die lip (250) is larger than the inner diameter (D3), and a difference between the inner diameter (D2) and the inner diameter (D3) makes a space for the extrusion of the adhesive resin,
    wherein the inner diameter (D1) of the outer dice (270) is larger than the inner diameter (D2), and a difference between the inner diameter (D1) and the inner diameter (D2) makes a space for the extrusion of the polyethylene resin.

6. The method of claim 1, wherein a strip (9) fixes the wound composite pipe (100) in the helix shape.

\* \* \* \* \*